July 13, 1943.   R. M. WICK   2,323,952
PLATING CRADLE
Filed July 12, 1939

INVENTOR
Richard M. Wick.
BY
*Ransom K. Davis*
ATTORNEY

Patented July 13, 1943

2,323,952

UNITED STATES PATENT OFFICE 2,323,952

PLATING CRADLE

Richard M. Wick, Allentown, Pa.

Application July 12, 1939, Serial No. 284,024

3 Claims. (Cl. 204—297)

(Granted under the act of March 3, 1883, as amended April 30, 1928; 370 O. G. 757)

This invention relates to improvements in friction surfaces, more particularly to an improved brake drum.

The development of high speed automobiles and, in a special sense, the development of modern aeroplanes, has focused attention on the braking apparatus of these vehicles. Essentially, a brake is a heat absorptive machine, the primary function of which is to transmute kinetic energy into heat. For many purposes, as for example in railroad brakes, additional energy absorption requirements can readily be met by increasing the size or number of the brake units. In other fields, however, as in automotive vehicles and more especially in aeroplanes, definite limitations are placed on the size and weight of the brake units. In an automobile of the present general design, the brake drum area of wheel brakes is established definitely by the size of the ground wheels. In aeroplanes this same condition obtains and, furthermore, because of the pay-load criterion of value or efficiency, definite limitations are placed upon the weight of the braking apparatus. To keep pace with the general automotive and aeronautic development, those skilled in the art have devoted considerable attention to increasing the efficiency of brake structures while maintaining these within the inherently imposed limits as to size and weight.

In the automotive and aeronautic fields, there are a number of subsidiary problems that are injected into the design of an efficient brake structure. For example, the conventional automobile is produced with wheel brakes on the front or dirigible wheels as well as the rear wheels. In these circumstances, equalization of the braking action, and more particularly smoothness of the braking action is of prime importance, for, as is known, grabbing or locking of the dirigible wheel is a cause of skidding and consequent accidents. The dangers arising from a locked brake are even greater in an aeroplane, for here directional control while taxiing is largely obtained by means of the independent effect of the brakes on the front landing wheels. A factor of paramount importance in respect to the smooth operation is the coefficient of friction between the rotating and non-rotating brake elements. A desideratum in such braking structures is, therefore, a low and uniform, or maintained, coefficient of friction.

Since in the nature of its use a braking surface is subjected to drastic wear and accentuated shearing effects, another highly important characteristic of a braking surface is a high resistance to wear and abrasion.

In their normal use, the brakes on automobiles and aeroplanes are subjected to corrosion and this condition is of course encountered to an aggravated degree in the case of aeroplanes operating in, over or near sea water where potential accelerated corrosive effect of salt spray is present. When a brake drum is constructed of iron, pressed steel or pressed steel having a centrifuged cast iron liner, the frictional surface tends to oxidize. When the brake is applied, this relatively loosely adherent oxide is sheared off. During this period of operation the coefficient of friction is markedly changed; furthermore, the oxide tends to become embedded in the frictional material on the brake shoe and correspondingly modifies its coefficient of friction. For this and other reasons it is advantageous to utilize a brake drum which has a braking surface of a relatively non-oxidizable metal and preferably one which is refractory or heat resistant.

These several desiderata in brake drum construction are admirably fulfilled by utilizing a surface of chromium, provided such surface is of sufficient thickness and homogeneity. It is to this type of structure that the present invention relates.

Now it has been suggested heretofore to produce a brake drum by electrodepositing a plate of chromium on a brake drum. These prior suggestions, however, contemplated the utilization of a chromium plate of the usual thickness employed in the decorative practice, i. e., of the order of twenty millionths of an inch and under the usual conditions of decorative plating, such as a current density of the order of from 40 to 200 amps. per sq. ft.

As a result of intensive experimentation, it has been found that a greatly improved brake drum, characterized by a low coefficient of friction, high wear resistance and longevity may be produced by applying to the braking flange of a brake drum, or to a ferruginous liner to be mounted in a drum, an electrodeposited chromium plate of substantial thickness. Under the present invention, chromium surfaces of the order of 0.003 inch are utilized. Under the conditions of the operation, to be more particularly described, this chromium surface is characterized by an exceptionally high resistance to wear, a striking adherence to the basis metal and a desirably low coefficient of friction. The chromium surface is applied, as will be seen, under conditions which insure a uniform deposition on the cylindrical braking surface, so that even with the heavy plates herein produced minimal tolerance may be maintained.

As compared to earlier suggestions wherein a thin film or skin of chromium was suggested and which, by reason of the extreme thinness, partook of the essential physical characteristics of underlying metal, the present invention contemplates the utilization of substantial massive or thick chromium plates. The chromium surfaces applied under the present invention are thus sufficiently massive that they possess the true inherent characteristics of chromium. Under the circumstances of the invention, the chromium surface is fine grained and smooth, for the plate is of sufficient thickness so that, unlike earlier plating, the physical shape or submacroscopic contour of the basis metal is not reproduced in the exposed surface of the plate. As will be more particularly seen, the new method of producing braking surfaces permits the deposition of chromium under such controlled conditions of uniformity that the necessary tolerance may readily be maintained. This is in sharp contradistinction to earlier practice which was characterized by non-uniform deposition over non-planar surfaces.

In order to insure a complete comprehension of the invention, illustrative methods of producing a brake drum will be described and shown in the accompanying drawing, in which.

Figure 1:
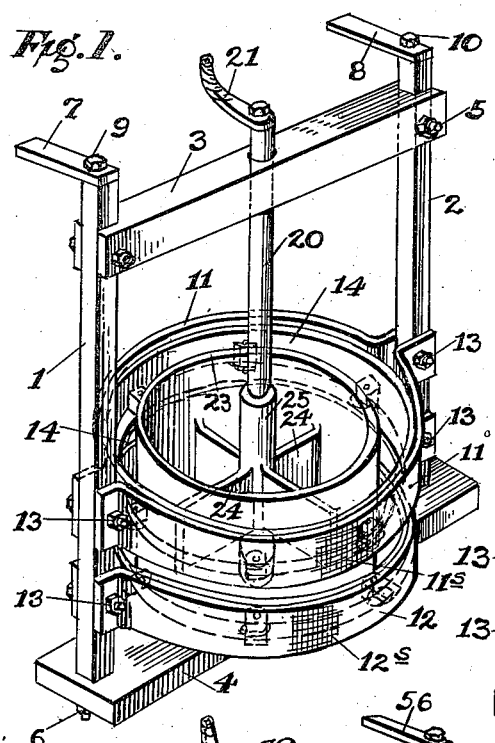
Figure 1 is a perspective view of a brake drum liner associated with an anode whereby the improved plate is applied.

In producing frictional surfaces under the present invention, the chromium is plated out by an improved rapid method more particularly described in copending application Serial No. 283,398, filed July 8, 1939, that is to say, the chromium is plated from a special electrolyte containing for example 275 grams per liter of chromic acid, from approximately 5 grams to 7 grams per liter of sulphuric acid, at a temperature of from approximately 55° C. to 90° C. and at current densities of from 500 to 5000 or more amps. per sq. ft. As is more particularly described in copending application Serial No. 283,398, filed July 8, 1939, to secure a fine grained, smooth, bright chromium plate when operating at these high current densities, it is necessary to establish and maintain a correlated balance of trivalent and chromium ions. If the trivalent chromium ion concentration is allowed to build up to too high a degree, there is a decided tendency to the production of rough deposits with a commensurate undesirable modification of the coefficient of friction of the plate. In the illustrative electrolyte, that is to say, one containing 275 grams per liter of chomic acid and 5 to 7 grams per liter of sulphuric acid, the trivalent chromium should be maintained at a concentration of between ½ and 5 grams per liter of the solution.

It has been found that eminently satisfactory results are secured by applying the chromium surface directly on steel or on a preliminary or underlying plate of nickel or equivalent corrosion resistant metal. Such nickel surface may be deposited from any suitable electrolyte, such as a typical nickel sulphate bath. The nickel may be deposited to a thickness of from approximately 0.0005 to 0.020 inch.

To insure the optimum physical characteristics of the chromium braking surface, it is important that the basis metal not only be thoroughly cleaned, but also that it be chemically resurfaced. Such cleaning comprises a degreasing, as for example with a suitable organic solvent, such as trichloroethylene, followed by treatment with an alkaline cleaner which, if desired, may be used as an electrolytic cleaner. If used as an electrolytic cleaner, the work, i. e., the brake drum or liner, may be connected in the circuit either as the anode or cathode. Preferably after such alkaline cleaning the work is rinsed and the adsorbed film on the metal surface is neutralized and any oxide film is removed by a brief immersion in sulphuric acid of approximately 10% strength. The chemical resurfacing of the work is then completed by an anodic etching treatment in a solution of sulphuric or chromic acid, or, preferably, a mixture of sulphuric and chromic acids. After the treatment, the work is thoroughly rinsed and, while kept wet, is quickly assembled in the anode structure. The work is then plated in the special bath under the conditions above set forth.

As indicated hereinbefore, an important condition in producing the improved frictional surfaces is the assurance of a uniform deposition of chromium on the cylindrical surface. It has been found that in operations of the present character wherein chromium is rapidly deposited at extremely high current densities the maldistribution of current which characterizes chromium plating is accentuated, that is to say, the tendency to the deposition of uneven thicknesses of chromium especially on non-planar surfaces is markedly apparent. Under the principles of the present invention, the plating operations are so conducted that a substantially uniform deposition of chromium on the cylindrical surfaces is positively insured. This is accomplished by insuring an adequate conductive path for the high density current by insuring positive pressure between the separable parts of the circuit, confining the effect of the current to those areas desired to be plated and uniformly and preferably closely spacing a conformed anode to the work, that is, the brake liner or braking flange of the drum.

Figure 2:
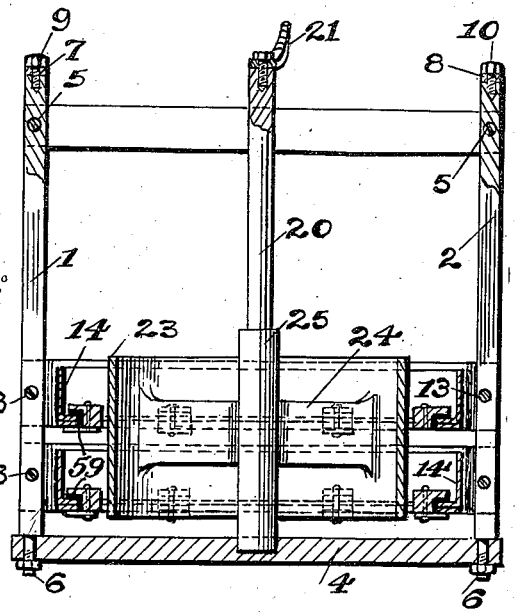
Figure 2 is a cross-section of the structure shown in Figure 1.

Such a result is readily achieved by utilizing a structure of the type shown in Figures 1 and 2. This structure may, for the sake of a term, be considered a plating cradle, which, as will be appreciated, is adapted to be immersed in a tank (not shown) containing the improved electrolyte. As shown this structure comprises two metallic posts or conductors 1 and 2. To the conductors 1 and 2 are attached the non-conducting members 3 and 4, composed of Bakelite, hard rubber, or other suitable insulating material. The member 3 may be formed with bifurcated ends in which, as shown in Figures 1 and 2, the members 1 and 2 are received. The bar 3 may securely be attached to members 1 and 2 at these points by suitable attaching means, such as the bolts and nuts 5. The lower insulating bar 4 and the lower ends of members 1 and 2 may be tapped and threaded so as to receive the bolts 6 by means of which the several elements are securely attached.

As shown in Figure 1, the metallic brackets 7 and 8 are secured in good electrical contact with the upper ends of bars 1 and 2 by suitable means, such as the bolts 9 and 10. Members 7 and 8 are conductors and may be made of any suitable metal, and serve to carry current to the work.

The members 1 and 2 serve as mounting or carrying means for a brake drum or brake liner fixture, as well as current carrying conductors. To these members are attached the cylindrical bands or brackets 11 and 12. Each band preferably is made up in two semi-cylindrical sections and, as shown, are rigidly secured to the bars 1 and 2 by suitable means, such as bolts and nuts 13, or equivalent means such as cam levers to permit quick assemblage and the application of a high degree of mechanical pressure.

The bands or rings 11 and 12 function to mount and firmly hold the work or brake drum liners 14. As will be appreciated, by adjusting the bolts 13, the liners may be held against the bands 11 and 12 under any desired tension. In order to confine the current to the area desired to be plated the outside surfaces of bands 11 and 12 may be protected by insulating shields such as the lacquer impregnated or coated fabric bands 11s and 12s. In these circumstances, therefore, the work is maintained under positive pressure and in good electrical contact with the members 11 and 12 substantially throughout their circumferences and the members 11 and 12 serve to protect or mark the exterior surfaces of the brake liners so that, as will be seen more fully, the chromium is selectively plated on the desired area, namely the internal surface of the braking flange.

The annular rings 59 of Figure 2 are of insulating material and serve to prevent the concentration of current on the focal zone presented by the inwardly projecting brake drum rib. As will be noted, this member is in two parts, so that it is readily applied to the indicated surface to be protected. Through using such a protecting device it is feasible to bring the anode surface 23 in closer proximity with the surface 14, which it is desired to plate, and in addition the distribution of the chromium over the braking surface 14 is accordingly improved.

It will be observed at this point that the brake drum liners form part of a cathode circuit through the metallic connections 11—12—13—1—2—7—8 to the source of current (not shown). The brake drum or liner is thus mounted in a conformed cathode fixture and is in good electrical contact with such fixture throughout its circumference.

As indicated hereinbefore, a factor of major importance in attaining maximum efficiency of the brake drum is a uniform deposition of chromium over the cylinder surface of the braking flange. In accordance with the present invention, this is accomplished by utilizing a special conformed anode so arranged that it is uniformly spaced from the work at all points in the circumference of the latter.

The improved anode structure includes the metallic shaft 20 which is tapped at its upper end to receive the conductor 21. Fitted on this shaft is a metallic drum 23, of steel or the like. Such drum comprises the relatively wide cylindrical member 23 which, as will be observed, may be of sufficient width to extend slightly above the upper band 11 and slightly below the lower band 12; in other words, the drum-shaped anode 23 comprehends within its zone of action the two brake drum liners. This is to say that with the one anodic structure a plurality of brake drum liners may simultaneously be plated. While two tension bands and their tension locked liners are shown, it will be understood that any desired number may be used. It will be appreciated also that if desired the effective surface of the anode may be increased to any desired degree by providing pins on the surface adjacent the work or cathode.

The anode drum 23, as shown particularly in Figure 1, is provided with a series of spider arms which are integral with or detachably secured to a central sleeve 25. Such sleeve is firmly abutted against the shaft 20 so as to insure good electrical contact. As shown in Figure 2, the non-conducting bar 4 is bored or tapped to provide an aperture for the reception of the lower end of the shaft 20 and its associated sleeve 25. The upper bar 3 similarly may be bored so as to serve as a mounting sleeve or bushing for the upper section of shaft 20. In this manner the shaft 20 and its associated anode drum 23 may quickly be assembled in the cradle and in such assembled position is accurately centered or aligned with the brake drum liners. It will be observed that four spider arms 24 are shown. This construction insures adequate current carrying capacity to the effective anode surface. In lieu of this any other similarly functioning structure may be employed.

It will be observed that the described structure insures a rapid assemblage or racking of the liners or brake drums while positively assuring the accurate placement of the work toward the anode required by the invention. In carrying out the plating the liners 14 are assembled in the cradle and while still wet from the final rinsing are immersed in the electrolyte in the tank. The conductors 7 and 8, and 21 are connected to a suitable source of current and chromium is selectively plated out directly on the steel braking flange of the liners at the high current densities mentioned. The plating is continued until a chromium surface of the desired thickness is applied. It has been found that a chromium plate of about 0.002 inch produces a high, improved braking surface. However, by regulating the plating time, and/or the current density, this plate may be increased or decreased in thickness. Improved brake drum structures, according to the invention, may be produced by applying chromium surfaces of from approximately 0.0002 to 0.020 inch in thickness.

In lieu of the procedure described, i. e., the assemblage of the cradle containing the anode and cathode units and the subsequent immersion in the bath, operations may be conducted by which the anode is immersed or retained in the bath, and the cathode, with the work clamped thereon, is slipped over the anode and then connected so that only the brake liners and associated connections are currently handled during operations.

It is particularly to be observed that operating under the conditions set forth, the chromium metal which is deposited has a hardness of from 650 to 850 Brinell. This is neither the hardest or softest chromium that can be deposited under the process, but it is found, as a result of many practical tests, that this is substantially the optimum range, for in this range the chromium is of optimum toughness and admirably withstands the drastic conditions of brake wear, including the stresses set up by heating and cooling incident to brake operation.

The braking surface thus produced is characterized by a high wear and abrasion resistance and extreme toughness. Tests have demonstrated that braking surfaces produced under the invention have a greatly increased life over earlier products. The hard, tough, highly adherent chromium surface resists scoring to a remarkable degree and insures a greatly prolonged period of efficient use. The massivity of the chromium plate imparts to the braking surface the intrinsic characteristics of chromium which are not attainable when but a film or thin skin of chromium is used.

The described method of racking and plating is merely illustrative of one effective process of producing the improved braking surfaces. As will be appreciated by those skilled in the art, other specifically different methods of restrictively or selectively plating out the chromium on the braking surface may be employed. Such an alternative method is diagrammatically shown in Figures 3 and 4.

Figure 3:
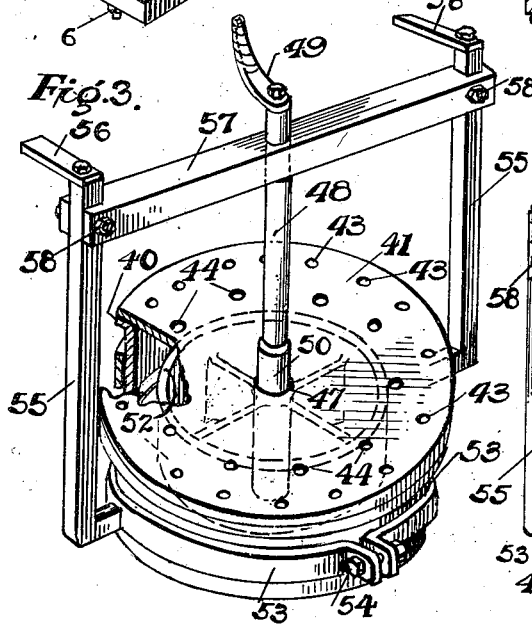
Figure 3 is a perspective view of a modified form of the invention.
Figure 4:
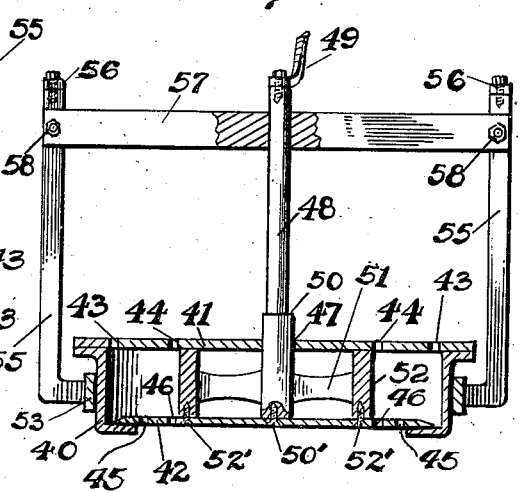
Figure 4 is a cross-section of the unit shown in Figure 3.

As shown in Figure 3, the work, such as the brake liner 40, is positioned between two insulating discs 41 and 42. The disc 41 is provided with a series of apertures 43 and 44, spaced around the circumference to permit the circulation of electrolyte therethrough, while the lower disc is similarly provided with two series of apertures 45 and 46. The upper disc may be provided with a central aperture 47 to receive the anode shaft 48 which is adapted to be connected to a suitable conductor 49. The lower disc 42 (like member 4, Figure 1) is provided with means for receiving and centering the shaft 48 and associated sleeve 50. As in the structure shown in Figure 1, the sleeve 50 carries a plurality of spider arms 51, which mount and conduct current to the cylindrical compound anode member 52. The sleeve 50 and anode 52 may be suitably secured in position by the bolts 50' and 52'.

A split ring or bracket 53, similar in function to member 11 of Figure 1, is adapted to tightly abut the liner 40 and establish good electrical contact therewith. The bracket is detachably secured, as by means of bolts, or equivalent means, 54, to the metallic supporting bars 55. Such bars are connected to the conductor 56 by which they are connected cathodically in the circuit.

In plating with such a method, the liner 40 and anode structure are placed between the insulating discs 41 and 42. The split metallic ring 53 is clamped on the exterior surface of the liner 40 by bolts 54 and is attached to the insulating supports 57 by means of the bolts 58. In these circumstances the liner is held under tension by the ring 53 and an excellent electrical contact is insured. When the unit is immersed in the electrolyte and the current is applied, the chromium is uniformly and selectively plated out on the internal cylindrical surface of the liner in the manner previously described. The provision of the cathode apertures 43—45 and anode apertures 44—46 insures free circulation of the electrolyte. The hydrogen evolved during plating escapes through the upper apertures and acts as a gas pump insuring free circulation of the electrolyte through the unit and thus precludes depletion of chromium ions in the plating zone.

Essentially this type of operation is the same as that previously described in that it provides means for equidistantly spacing the conformed anode from the work throughout the circumference of the latter and for confining the current path to, and equilibrating it over the area desired to be plated while at the same time masking the other areas of the work. Invoking the principles of the present invention it is thus possible to apply a tightly adherent, homogeneous and uniform plate of approximately 0.001 inch thickness in a period of 15 minutes or less, depending on the current density. This is in sharp contradistinction to prior practice in which to secure a plate of comparable thickness a plating period of substantially three hours would be required.

It is particularly to be observed that the chromium surfaces producible under the present invention are intrinsically different from those produced by usual methods. These novel surfaces differ in kind from earlier products as is attested by the striking differences in physical and physicochemical properties, such as hardness, toughness, homogeneity, and the like. Furthermore, as has been proven by extensive service tests, these improved characteristics are precisely those which are functionally involved in brake operation and which insure maximum efficiency.

It will be understood that the brake drums produced according to the present invention may be subjected to any preliminary or subsequent treatment to modify or improve the surfaces other than the braking surface. It will be understood also that, while a process of directly plating on steel has been described, the invention also contemplates utilizing an under plate of nickel. The portions of the brake drum, other than the braking surface, may be plated with suitable corrosion-resistant metals such as nickel, cadmium, and the like.

The invention described herein may be manufactured and/or used by or for the Government of the United States of America for governmental purposes without the payment of any royalties thereon or therefor.

While preferred modifications of the method of producing braking surfaces have been described, it is to be understood that these are given didactically and that the invention resides not only in the described and equivalent methods of procedure but also in the concept of producing, as a new article, a braking surface having the defined improved characteristics.

I claim:

1. A plating cradle for cylindrical work wherein only one cylindrical surface is to be plated, comprising a separable circumferential metallic ring of a diameter to fit tightly against one cylindrical surface of the work, a framework for said ring including a pair of cathode bars on which said ring is mechanically supported and clamped against the work, insulating means holding said bars in spaced apart position and an anode bar supported by said insulating means between said cathode bars, and a conformed circumferential anode supported on said anode bar in juxtaposed position to the opposite cylindrical surface of the work.

2. A plating cradle for cylindrical work wherein only one cylindrical surface is to be plated, comprising a separable circumferential metallic ring of a diameter to fit tightly against one cylindrical surface of the work, a framework for said ring including a pair of cathode bars on which said ring is mechanically supported and clamped against the work, insulating means holding said bars in spaced apart position and an anode bar supported by said insulating means between said cathode bars, and a conformed circumferential anode supported on said anode bar in juxtaposed position to the opposite cylindrical surface of the work, said insulating means of said framework comprising a pair of bars secured to the ends of said cathode bars.

3. A plating cradle for cylindrical work wherein only one cylindrical surface is to be plated, comprising a separable circumferential metallic ring of a diameter to fit tightly against one cylindrical surface of the work, a framework for said ring including a pair of cathode bars on which said ring is mechanically supported and clamped against the work, an insulating bar holding said bars in spaced apart position, a pair of insulating discs adapted to close the circular end openings in said work, said discs being provided with a plurality of apertures adjacent the surface of said work for circulation of the electrolyte, and an anode bar supported by said insulating bar and the lower one of said discs, and a conformed circumferential anode supported on said anode bar between said discs in juxtaposed position to the opposite cylindrical surface of the work.

RICHARD M. WICK.